(12) United States Patent
Sato et al.

(10) Patent No.: US 8,475,947 B2
(45) Date of Patent: Jul. 2, 2013

(54) PERPENDICULAR MAGNETIC RECORDING MEDIUM

(75) Inventors: Akira Sato, Nagano (JP); Shunji Takenoiri, Yamanashi (JP); Yasushi Sakai, Nagano (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 116 days.

(21) Appl. No.: 12/596,440

(22) PCT Filed: Mar. 6, 2008

(86) PCT No.: PCT/JP2008/054089
§ 371 (c)(1),
(2), (4) Date: Mar. 10, 2010

(87) PCT Pub. No.: WO2008/132880
PCT Pub. Date: Nov. 6, 2008

(65) Prior Publication Data
US 2010/0167093 A1    Jul. 1, 2010

(30) Foreign Application Priority Data

Apr. 19, 2007  (JP) ................................ 2007-110748
Feb. 12, 2008  (JP) ................................ 2008-030357

(51) Int. Cl.
*G11B 5/66* (2006.01)

(52) U.S. Cl.
USPC ....................................................... 428/828.1

(58) Field of Classification Search
None
See application file for complete search history.

(56) References Cited

U.S. PATENT DOCUMENTS

| | | | |
|---|---|---|---|
| 2006/0147759 A1* | 7/2006 | Lee et al. | 428/830 |
| 2006/0177703 A1* | 8/2006 | Takenoiri et al. | 428/829 |
| 2006/0228586 A1* | 10/2006 | Girt et al. | 428/828 |

FOREIGN PATENT DOCUMENTS

| | | |
|---|---|---|
| CN | 1734565 A | 2/2006 |
| JP | 2004-310910 A | 11/2004 |
| JP | 2006-048900 A | 2/2006 |
| JP | 2006-309922 A | 11/2006 |

* cited by examiner

*Primary Examiner* — Holly Rickman
*Assistant Examiner* — Lisa Chau
(74) *Attorney, Agent, or Firm* — Rabin & Berdo, P.C.

(57) ABSTRACT

A perpendicular magnetic recording medium, which includes a first magnetic recording layer, a second magnetic recording layer, and a third magnetic recording layer disposed sequentially on a nonmagnetic substrate, and a coupling layer formed between the first and second magnetic recording layers. The first, second and third magnetic recording layers have an easy axis of magnetization in a direction perpendicular to a film plane of the nonmagnetic substrate. The first and second magnetic recording layers are ferromagnetically coupled via the coupling layer.

18 Claims, 8 Drawing Sheets

PERPENDICULAR MAGNETIC RECORDING MEDIUM

BACKGROUND OF THE INVENTION

1. Field of the Invention

This invention relates to perpendicular magnetic recording media mounted in various magnetic recording devices. More specifically, this invention relates to perpendicular magnetic recording media mounted in hard disk drives (HDDs) used as storage devices in computers, audio and video equipment, and similar.

2. Description of the Related Art

In recent years there has been a rapid increase in the recording density of hard disk drives (HDDs), and this trend is expected to continue. However, when using conventional magnetic recording media employing in-plane magnetic recording, because of the problem of the "thermal fluctuation" phenomenon due to which recorded signals cannot be held with stability, a recording density limit was being approached. Hence in order to address demands for substantial increases in recording densities, much research had been performed on perpendicular magnetic recording media, adopting the perpendicular magnetic recording method with its feature, diametrically opposed to the behavior of the in-plane magnetic recording method, by which bit stability increases as recording densities are increased; and perpendicular magnetic recording media are now being commercialized.

In order to raise magnetic recording medium densities, it is necessary to promote the magnetic separation of crystal grains forming the magnetic recording layer and to diminish the unit of magnetization reversal. Thermal stability, which represents the durability of a magnetic body to thermal fluctuations, is indicated by the index KuVa which is the product of the uniaxial anisotropy constant Ku and the activation volume Va. Here, Va is known to be correlated with the volume V of the magnetization reversal unit. That is, the smaller is the value of KuVa or of KuV, the lower is the thermal stability of the magnetic recording media. As is clear from this index, in order to raise the recording density, the magnetization reversal unit is reduced, and thermal stability is also diminished, so that thermal fluctuations pose a problem even for perpendicular magnetic recording media. Hence in order to maintain thermal stability even when the magnetization reversal unit is reduced, Ku must be increased.

On the other hand, it is known that the magnetic field intensity necessary during recording in an HDD is substantially proportional to the value of Ku. Hence, when Ku is increased in order to maintain thermal stability, the magnetic field intensity necessary during recording increases, and when this increase is substantial, cases occur in which recording is not possible.

Further, as the magnetization reversal unit is reduced, the demagnetizing field also grows smaller, and so the reversal magnetic field of the magnetic recording layer increases. That is, the smaller is the magnetization reversal unit, the higher is the magnetic field intensity necessary for recording.

Hence, in the interest of higher recording densities, finer magnetization reversal units and increased Ku contribute to the improvement of the recording resolution and thermal stability of the magnetic recording media, both lead to a reduced ability to record on the magnetic recording media (hereafter also expressed as "ease of recording").

In light of the above circumstances, a method is sought to improve the thermal stability and electromagnetic transducing characteristics of magnetic recording media, without detracting from the ease of recording.

As a method of resolving this problem, in Japanese Patent Application Laid-open No. 2006-48900 a method is proposed for providing perpendicular magnetic recording media with the object of improving ease of recording without detracting from thermal stability by providing a coupling layer between the two layers of a magnetic recording layer with a two-layer structure, and for improving noise characteristics, S/N characteristics, and other performance aspects, to simultaneously raise the density and improve the ease of recording.

However, if magnetization reversal units are made finer with the aim of further raising the density, the fraction of the magnetic recording layer occupied by the granular structure with a high Ku is increased, the switching magnetic field is increased, and there is a limit to the ability to suppress the decline in ease of recording of the magnetic recording media. And, if the low-Ku layer thickness is increased to ease magnetization reversal with the aim of maintaining ease of recording, the fraction occupied in the high-Ku magnetic layer declines, and higher recording densities become difficult to achieve. Hence, in order to further raise the recording density, a new technology is needed to obtain a high recording resolution while keeping the coercivity Hc, which depends on Ku, at a low level.

SUMMARY OF THE INVENTION

This invention was devised in light of the above-described problems, and has as an object the provision of a perpendicular magnetic recording medium in which the magnetic recording layer comprises three layers with different Ku values, and which achieves improved ease of recording without detracting from thermal stability. Moreover, a further object is to provide a perpendicular magnetic recording medium which simultaneously achieves improved noise characteristics, S/N characteristics, other performance characteristics, and higher densities and improved ease of recording.

In order to attain the above-described objects, a perpendicular magnetic recording medium of this invention, formed by layering in order on a nonmagnetic substrate at least a soft magnetic backing layer, an underlayer, and a magnetic recording layer, is characterized in that the magnetic recording layer has at least a first magnetic recording layer, a second magnetic recording layer, and a third magnetic recording layer. A coupling layer is provided between the first magnetic recording layer and the second magnetic recording layer. The first magnetic recording layer and second magnetic recording layer are ferromagnetically coupled via the coupling layer. The first magnetic recording layer and second magnetic recording layer have a granular structure, and, the first magnetic recording layer, second magnetic recording layer, and third magnetic recording layer have directions of easy axis of magnetization in the direction perpendicular to the plane of the nonmagnetic substrate.

By this means, the switching magnetic field can be lowered and ease of recording enhanced, without impeding thermal stability.

Here, it is especially preferable that, among the first magnetic recording layer, second magnetic recording layer, and third magnetic recording layer, at least the magnetic recording layers which are ferromagnetically coupled and made continuous via the coupling layer have a granular structure, in which magnetic crystal grains are dispersed in a matrix of nonmagnetic oxides or nonmagnetic nitrides.

Further, it is preferable that the values of the uniaxial anisotropy constant Ku be different for each of the magnetic recording layers with a granular structure. As the relation between these values, it is especially preferable that the uniaxial anisotropy constant Ku1 of the first magnetic recording layer and the uniaxial anisotropy constant Ku2 of the second magnetic recording layer be in the relation Ku1>Ku2.

Further, it is preferable that the coupling layer comprises an element selected from among V, Cr, Fe, Co, Ni, Cu, Nb, Mo, Ru, Rh, Ta, W, Re, and Ir, or comprises an alloy, the main component of which is at least one of the above mentioned elements.

Further, it is preferable that the thickness of the coupling layer be 0.3 nm or less.

By means of this invention, ferromagnetic coupling between magnetic recording layers in a perpendicular magnetic recording medium can be set appropriately, and moreover, by providing a high-Ku layer and a low-Ku layer, the index KuV can be improved and the average coercivity Hc of the magnetic recording layers overall can be lowered, so that the switching magnetic field of the magnetic recording medium can be lowered without detracting from thermal stability, and at the same time improvements in the noise characteristics, S/N characteristics, and other performance characteristics of the magnetic recording medium can be attained. Moreover, by means of a magnetic recording layer structured as three magnetic recording layers with different Ku values, magnetization reversal occurs in order from the magnetic recording layer with low Ku, that is, with low Hc, facilitating magnetization reversal in the magnetic recording layer with high Ku. By this means, improvements in the thermal stability, ease of recording, and recording density of the magnetic recording medium can be simultaneously achieved.

BEST MODE FOR CARRYING OUT THE INVENTION

Figure 1:
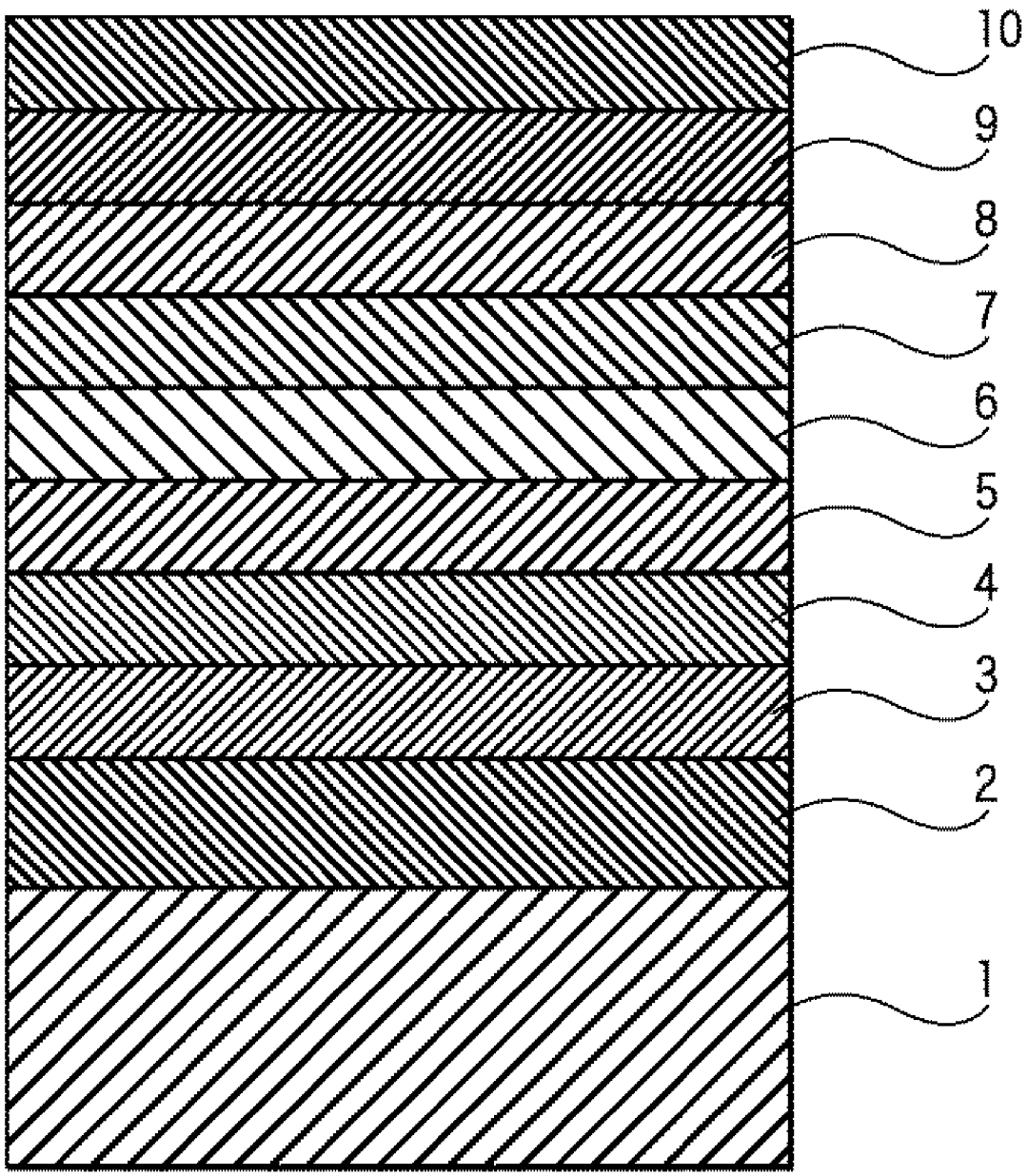
FIG. 1 is a schematic cross-sectional view showing an aspect of a perpendicular magnetic recording medium of the invention.

Below, aspects of the invention are explained, referring to the drawings.

In this invention, a structure is employed in which, in the ferromagnetically coupled magnetic recording layers with different Ku values proposed in Japanese Patent Application Laid-open No. 2006-48900, a magnetic recording layer with a granular structure is substituted for a portion of the low-Ku layer, in order to further raise the density and improve ease of magnetization reversal. Magnetization reversal is performed sequentially from the low-Ku layer, to the substituted granular-structure magnetic recording layer, and to the high-Ku layer, and as a result ease of recording can be maintained, thermal stability can be secured, and the recording density can be raised.

Detailed experimental studies were conducted on the conditions of the magnetic recording layers, the materials and film thickness of the coupling layer used to control the exchange coupling energy between magnetic recording layers, and on other parameters.

Below, the invention is explained in further detail.

FIG. 1 is a schematic cross-sectional view used to explain an aspect of a perpendicular magnetic recording medium of this invention. As shown in FIG. 1, in a perpendicular magnetic recording medium of an aspect of the invention, a soft magnetic backing layer 2, a underlayer 3, a nonmagnetic intermediate layer 4, a first magnetic recording layer 5, a coupling layer 6, a second magnetic recording layer 7, a third magnetic recording layer 8, a protective layer 9, and a liquid lubricant layer 10 are formed, in order, on a nonmagnetic substrate 1.

As the nonmagnetic substrate 1, a substrate normally used in a magnetic recording medium may be employed; for example, an Al alloy with NiP plating, reinforced glass, crystallized glass, or similar can be used. When the substrate heating temperature is held to within 100° C., a plastic substrate of polycarbonate, polyolefin or another resin can also be used.

It is preferable that the soft magnetic backing layer 2 be formed in order to control magnetic flux from the magnetic head used in magnetic recording to improve the read/write characteristics, but the soft magnetic backing layer can be omitted. As a soft magnetic backing layer, crystalline FeTaC, Sendust (FeSiAl) alloy or similar, or amorphous Co alloys such as CoZrNb and CoTaZr or similar can be used. The optimum value for the thickness of the soft magnetic backing layer 2 varies depending on the structure and characteristics of the magnetic head used in recording, but when deposited continuously with other layers, a thickness of 10 nm or greater and 500 nm or less is desirable in consideration of productivity. When deposited in advance on the nonmagnetic substrate before the deposition of other layers using a plating method or similar, this layer can also be made as thick as several μms.

The underlayer 3 is a layer which preferably is formed thereupon to control the crystal orientation, crystal grain diameters, and similar in the nonmagnetic intermediate layer 4 or first magnetic recording layer 5, and can be formed using a nonmagnetic material or a soft magnetic material. The underlayer can also be omitted.

When using the soft magnetic material, the underlayer takes over a portion of the functions of the soft magnetic backing layer, and so can be used preferentially. As the soft magnetic material, the Permalloy system materials NiFeAl, NiFeSi, NiFeNb, NiFeB, NiFeNbB, NiFeMo, NiFeCr, or similar can be used. The thickness of a Permalloy system underlayer may be adjusted such that the magnetic characteristics and electromagnetic transducing characteristics of the magnetic recording layers are optimal, but it is desirable, in light of both the magnetic recording medium characteristics and productivity, that the thickness be approximately 3 nm or greater and 50 nm or less.

As a nonmagnetic material, Ta, Zr, Ni3Al, or other materials can be used. When using a nonmagnetic material, from the standpoint of effectively causing the magnetic field generated by the recording head to be concentrated in the soft magnetic backing layer, it is desirable that the film thickness be thinner, at 0.2 nm or greater and 10 nm or less.

The nonmagnetic intermediate layer 4 is formed in order to suitably control crystal orientation, crystal grain diameters, and grain boundary segregation in the first magnetic recording layer 5. It is possible to omit the formation of the nonmagnetic intermediate layer 4. As for the material, use of Ru, or a Ru-base alloy containing one or more elements selected from among the group comprising C, Cu, W, Mo, Cr, Ir, Pt, Re, Rh, Ta and V, or else Pt, Ir, Re, or Rh, or similar, is preferable. The thickness of the nonmagnetic intermediate layer must be reduced insofar as possible without causing degradation of the magnetic characteristics or electromagnetic transducing characteristics of the magnetic recording layers, in order to realize high recording densities; specifically, a thickness of 1 nm or greater and 20 nm or less is preferable.

In the first magnetic recording layer 5, a ferromagnetic material which is an alloy comprising at least Co and Pt may suitably be used; it is necessary, to enable the use of the medium as a perpendicular magnetic recording medium, that the easy axis of magnetization (for example, the c axis in the hexagonal close-packed structure) be oriented in the direction perpendicular to the film plane. For the first magnetic recording layer 5, a magnetic recording layer comprising an alloy material such as CoPt, CoCrPt, CoCrPtB, CoCrPtTa, or similar; a multilayer film such as (Co/Pt)n, (Co/Pd)n, or similar; or, a granular material such as CoPt—$SiO_2$, CoCrPtO, CoCrPt—$SiO_2$, CoCrPt—$Al_2O_3$, CoPt—AlN, CoCrPt—$Si_3N_4$, or similar can be used.

A granular structure is a structure in which magnetic crystal grains are dispersed in a matrix of nonmagnetic oxides or nonmagnetic nitrides; interaction between magnetic crystal grains in proximity within the magnetic recording layer can be suppressed. Hence, when a ferromagnetic coupling layer is provided between the first magnetic recording layer and the second magnetic recording layer, coupling between magnetic recording layers can be maintained while suppressing the interaction between magnetic crystal grains in the magnetic recording layers. As a result, the noise, S/N, and other characteristics can be improved, and so a granular structure is especially preferable for use in the first magnetic recording layer.

The coupling layer 6 is used for reasons similar to those described in Japanese Patent Application Laid-open No. 2006-48900. That is, this layer is necessary to cause appropriate ferromagnetic coupling between the first magnetic recording layer 5 and the second magnetic recording layer 7, and to lower the average coercivity Hc for the magnetic layers as a whole. When considering the magnetization reversal mechanism in the magnetic recording layers, if two magnetic recording layers are layered without a coupling layer therebetween, magnetization reversal occurs simultaneously in these magnetic recording layers, and the Hc of the magnetic recording layers as a whole cannot be effectively lowered. On the other hand, in the case of magnetic recording layers with a coupling layer provided, during application of an external magnetic field the magnetization is first reversed in the magnetic recording layer with the lower uniaxial anisotropy constant Ku and lower Hc among the magnetic recording layers above and below the coupling layer, and under the influence of this reversal, magnetization reversal is facilitated in the magnetic recording layer with the lower Ku and with the high Hc, while the Hc for the magnetic recording layers as a whole is lowered. The upper and lower magnetic recording layers undergo two-stage magnetization reversal through different magnetization rotations, and consequently the thermal stability is improved while lowering the switching magnetic field, effectively contributing to enhance ease of recording.

When an exchange coupling between layered magnetic recording layers via a coupling layer is completely cut off, the energy barrier is lowered, and the thermal stability cannot be improved. Hence, from the standpoint of deriving an appropriate coupling energy between magnetic recording layers in order to effectively lower the Hc while maintaining ferromagnetic coupling, a coupling layer is necessary. Ferromagnetic coupling between magnetic recording layers must occur at normal temperatures at which the perpendicular magnetic recording medium is used.

As to the material used in the coupling layer 6, it is preferable that a material selected from among V, Cr, Fe, Co, Ni, Cu, Nb, Mo, Ru, Rh, Ta, W, Re or Ir, or an alloy the main component of which is one of these, be used. In the case of a nonmagnetic material such as V, Cr or Cu, by adjusting the film thickness, a ferromagnetic coupling between magnetic recording layers and an appropriate coupling energy can be obtained. When using Fe, Co or Ni, which are ferromagnetic materials, in an alloy with a nonmagnetic material, by adjusting the film deposition conditions, deposition environment, and similar, an appropriate coupling energy can be obtained.

It is preferable that the film thickness of the coupling layer 6 be 0.3 nm or less. This is because, when the material of the coupling layer 6 is a material other than Fe, Co or Ni, by making the thickness of the coupling layer 6 0.3 nm or less, the coupling energy can be controlled over a wide range, and, moreover, magnetic separation between the crystal grains forming the magnetic recording layer can be secured more satisfactorily, so that noise can be reduced. In the case of Fe, Co or Ni, by making the film thickness 0.3 nm or less, the effect of the magnetic characteristics of the Fe, Co or Ni can be suppressed to where they can be ignored.

As to the second magnetic recording layer 7, the material and configuration similar to those of the first magnetic recording layer 5 can be used. When providing ferromagnetic coupling via a coupling layer, the interaction between magnetic crystal grains within a magnetic recording layer can be suppressed while maintaining coupling between magnetic recording layers, so that, similarly to the first magnetic recording layer, a granular structure is especially preferable for the second magnetic recording layer. Also, the fraction of granular material is increased for the magnetic recording layers overall, the magnetization reversal unit can be reduced, and higher densities become possible.

The first magnetic recording layer and second magnetic recording layer are set so as to satisfy the following relation. When the first magnetic recording layer has a uniaxial anisotropy constant $Ku_1$ and film thickness $T_1$, and the second magnetic recording layer has a uniaxial anisotropy constant $Ku_2$ and film thickness $T_2$, the film thickness and material of the first and second magnetic recording layers are set so that the relation $Ku1T1>Ku2T2$ is satisfied.

The reason for this is to cause magnetization reversal to occur first in the second magnetic recording layer; by this means, the switching magnetic field can be effectively lowered, without impeding thermal stability. For this reason, the relation in the magnitudes of $Ku_1T_1$ and $Ku_2T_2$ is stipulated. By this means, the advantageous result of lowering the switching magnetic field can be obtained simultaneously with the advantageous result of improving thermal stability.

As the third magnetic recording layer 8, the material and configuration similar to those of the first magnetic recording layer 5 and second magnetic recording layer 7 can be used.

The first magnetic recording layer, second magnetic recording layer, and third magnetic recording layer are set so as to satisfy the following relation. When the third magnetic recording layer has a uniaxial anisotropy constant $Ku_3$ and film thickness $T_3$, based on reasons similar to those above, the film thicknesses and materials of the first and third magnetic recording layers are set such that the relation with the first magnetic recording layer is $Ku_1T_1 > Ku_3T_3$. On the other hand, the relation with the second magnetic recording layer is set such that $Ku_3$ and $Ku_2$ are not equal, and preferably such that $Ku_3 < Ku_2$. In addition, the relations $Ku_1 \geqq 10Ku_2$ and $Ku_1 \geqq 10Ku_3$ enable reliable maintenance of thermal stability, and so are still more desirable.

It is known that in order to reduce media noise and improve the S/N, reduction of the Pt content in the magnetic recording layer is preferable. However, as the Pt content is reduced the thermal stability is degraded. Hence, when thermal stability is secured in a conventional magnetic recording layer, the Pt content has been set to exceed 10 at %. On the other hand, if a layered magnetic recording layer with coupling energy controlled of this invention is used, adequate thermal stability can be maintained, and so the Pt content can be reduced. More specifically, it is possible to reduce the Pt content in the magnetic recording layer with the lowest Ku value, that is, the third magnetic recording layer in which magnetization reversal first begins. A material containing no Pt at all can also be used in the third magnetic recording layer. Further, Japanese Patent Application Laid-open No. 2006-48900 has clarified that when Pt is comprised, by lowering the content to 10 at % or lower, media noise is reduced and the S/N is improved, and, in addition, the switching magnetic field can be effectively lowered. That is, with respect to the compositions of magnetic recording layers, it is preferable that in the third magnetic recording layer with the lowest Ku value, at least Co and Cr be comprised, and when Pt is included, it is preferable that the Pt content be 10 at % or lower. Further, it is still more preferable that the magnetic recording layer comprise at least one element selected from among Ta, B, Nb, N, and Cu. By means of such a composition, media noise can be further reduced, and the advantageous result of effectively lowering the switching magnetic field of the magnetic recording layer is obtained.

Here, the second magnetic recording layer and third magnetic recording layer are described. As stated above, the structure of a magnetic recording layer of this invention is a structure in which, within the magnetic recording layer with a two-layer structure proposed in Japanese Patent Application Laid-open No. 2006-48900, a granular-structure second magnetic recording layer is substituted for a portion of the low-Ku layer, and the third magnetic recording layer is equivalent to the low-Ku layer of the prior art. The reasons for providing a coupling layer between the first and second magnetic recording layers are to lower the Hc using the coupling layer, and moreover to suppress lowering of the effective Ku and suppress degradation of thermal stability. A coupling layer is not provided between the second and third magnetic recording layers. This is in order to lower the effective Ku of the second magnetic recording layer and third magnetic recording layer, to lower the switching magnetic field, and to improve the ease of recording. That is, the third magnetic recording layer with the lowest Ku value, which is coupled with the second magnetic recording layer without a coupling layer therebetween, enables more effective reduction of Hc utilizing a low Ku value. Further, by controlling the exchange coupling between magnetic particles using the Pt content and such elements as Ta, B, Nb, N, and Cu, a magnetization switching initiation magnetic field Hn can be secured even when the fraction of the low-Ku layer accounting for the entirety of the magnetic recording layers is increased in order to secure the ease of recording. As a result, reduction of media noise is further promoted, and higher recording densities and ease of recording can be achieved together with maintenance of thermal stability.

As the protective layer 9, for example a thin film the main component of which is carbon is used. Otherwise, various thin film materials generally used as the protective layers of magnetic recording medium may be used.

As the liquid lubricant layer 10, for example a perfluoro polyether lubricant can be used. Otherwise, various lubricant materials generally used as the liquid lubricant materials of magnetic recording medium may be used.

Each of the layers formed on the nonmagnetic substrate can be formed using the various film deposition techniques commonly used in the field of magnetic recording medium. To form each of the layers except for the liquid lubricant layer, for example a DC magnetron sputtering method, RF magnetron sputtering method, or vacuum evaporation deposition method can be used. To form the liquid lubricant layer, for example a dipping method or spin-coating method can be used.

Below, embodiments of a perpendicular magnetic recording medium of the invention are explained in greater detail; however, the invention is not limited to these embodiments, and of course various modifications are possible without deviating from the gist of the invention.

An example of a perpendicular magnetic recording medium fabricated using the configuration shown in FIG. 1 is described.

Embodiment 1

As the nonmagnetic substrate 1, an Al alloy plated with NiP and with a flat surface was used; after cleaning, the substrate was introduced into a sputtering device, and a Co—Zr—Nb target was used to deposit a CoZrNb amorphous soft magnetic backing layer 2 of thickness 40 nm. Next, a target of Ni—Fe—Si, which is a Permalloy system alloy, was used to deposit an NiFeSi underlayer 3 of thickness 10 nm. Then, a Ru target was used to deposit a Ru nonmagnetic intermediate layer 4 of thickness 10 nm. Then, a 93(Co-8Cr-20Pt)-7SiO$_2$ target was used to deposit a granular-structure CoCrPt—SiO$_2$ first magnetic recording layer 5 of film thickness 4 to 8 nm. Next, a Ru target was used to deposit a Ru coupling layer 6 of film thickness 0.2 nm. Then, a 93(Co-15Cr-10Pt)-7SiO$_2$ target was used to deposit a granular-structure CoCrPt—SiO$_2$ second magnetic recording layer 7 of film thickness 4.0 nm. Then, a 93(Co-20Cr-5Pt)-7SiO$_2$ target was used to deposit a third magnetic recording layer 8 of film thickness 4 to 8 nm. Finally, a carbon target was used to deposit a protective layer 9 of carbon, of film thickness 3 nm, after which the substrate was removed from the vacuum device. The first, second and third magnetic recording layers were deposited by RF magnetron sputtering, and the other layers were formed by DC magnetron sputtering. Thereafter, a liquid lubricant layer 10 of a perfluoro polyether, of thickness 2 nm, was formed by the dipping method, to obtain a perpendicular magnetic recording medium.

COMPARISON EXAMPLE 1

Up until the Ru coupling layer 6, similar processes were used for film deposition; then, a 93(Co-15Cr-10Pt)-7SiO$_2$ target was used to deposit a granular-structure CoCrPt—SiO$_2$ second magnetic recording layer 7 of thickness 8 to 12 nm, and a third magnetic recording layer 8 was not deposited, so that the magnetic recording layer comprised two layers. Finally, a carbon target was used to deposit a protective layer 9 of carbon, of thickness 3 nm, and then the substrate was removed from the vacuum device. Films were deposited such that the overall magnetic recording layer thickness was 16 nm, equal to the overall thickness of the magnetic recording layer comprising three layers in the embodiment described above.

COMPARISON EXAMPLE 2

Up until the Ru coupling layer 6, similar processes were used for film deposition; then, a 96(Co-15Cr-10Pt)-4B target was used to deposit a granular-structure CoCrPtB second magnetic recording layer 7 of thickness 8 to 12 nm, and a third magnetic recording layer 8 was not deposited, so that the magnetic recording layer comprised two layers. Finally, a carbon target was used to deposit a protective layer 9 of carbon, of thickness 3 nm, and then the substrate was removed from the vacuum device. Films were deposited such that the overall magnetic recording layer thickness was 16 nm, equal to the overall thickness of the magnetic recording layer comprising three layers in the embodiment described above.

First, the Ku values of each of the magnetic recording layers in Embodiment 1 were measured as follows. As the film configuration, the amorphous soft magnetic backing layer was excluded, and a magnetic recording medium comprising only a first 8-nm-thick magnetic recording layer on a Ru intermediate nonmagnetic layer was formed; similarly, a magnetic recording medium on which only the second and the third magnetic recording layer was formed were fabricated, and a magnetic torquemeter was used to measure the uniaxial anisotropy constants Ku. As a result, $Ku_1$ for the first magnetic recording layer was $7.5 \times 10^6$ erg/cc, $Ku_2$ for the second magnetic recording layer was $2.0 \times 10^6$ erg/cc, and $Ku_3$ for the third magnetic recording layer was $1.3 \times 10^6$ erg/cc. From this, the relation Ku1>Ku2>Ku3 was satisfied.

Figure 2:
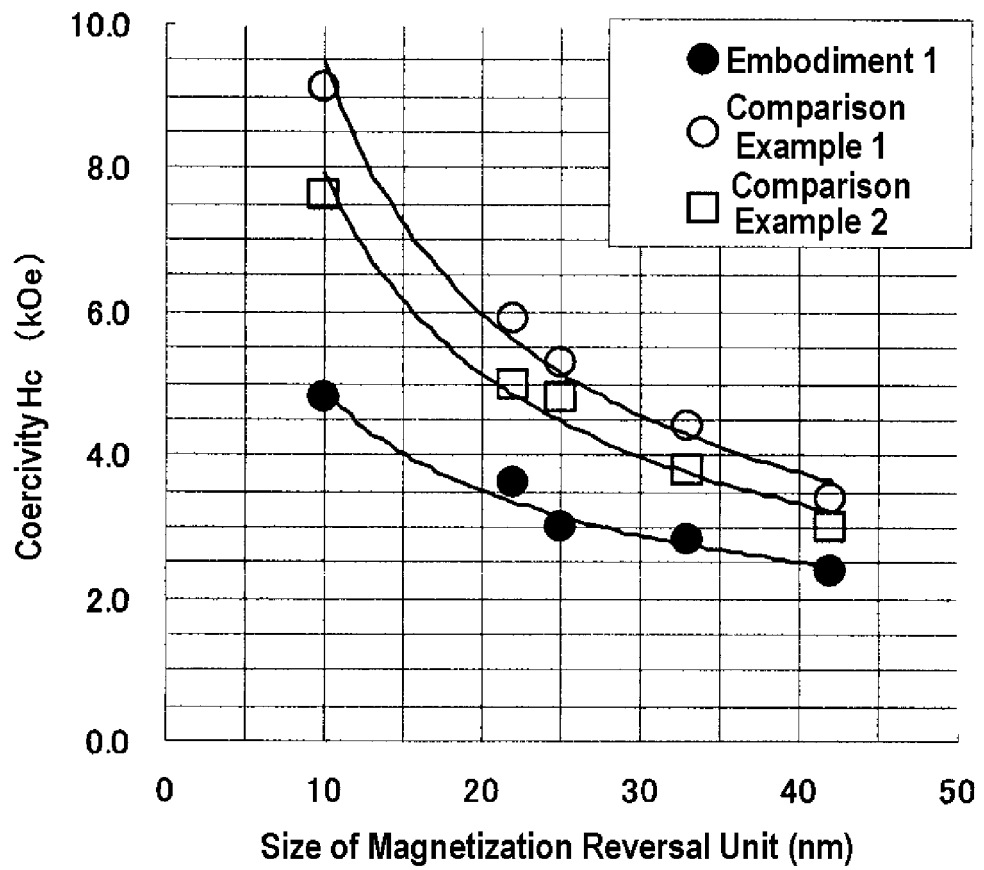
FIG. 2 compares characteristics for an embodiment of the invention and comparison examples.

Next, with the overall magnetic recording layer thickness held at 16 nm, film deposition was performed with the film thickness ratios of the magnetic recording layers controlled, and the coercivity Hc was measured for different magnitudes of the magnetization reversal unit in the magnetic recording medium; the results appear in FIG. 2.

From the figure, when comparing a case in which the magnetic recording layers immediately above the Ru coupling layer comprise second and third magnetic recording layers as in this invention with the case of a single magnetic recording layer, for the same magnetization reversal unit magnitude, clearly the Hc can be lowered by using a three-layer magnetic recording layer in which a granular-structure magnetic layer is substituted for a portion of the low-Ku layer as in this invention. That is, the recording density can be increases while maintaining ease of magnetization reversal. Also, the Ku of the first magnetic recording layer is sufficiently large, an index KuV of 60 or higher is obtained, and thermal stability can be reliably maintained.

Embodiment 2

Except for the fact that the CoZrNb amorphous soft magnetic backing layer 2 was not deposited, entirely the same processes as in Embodiment 1 were used to fabricate a magnetic recording medium.

COMPARISON EXAMPLE 3

Except for the facts that the CoZrNb amorphous soft magnetic backing layer 2 and the Ru coupling layer 6 were not deposited, entirely the same processes as in Embodiment 1 were used to fabricate a magnetic recording medium.

Figure 3:
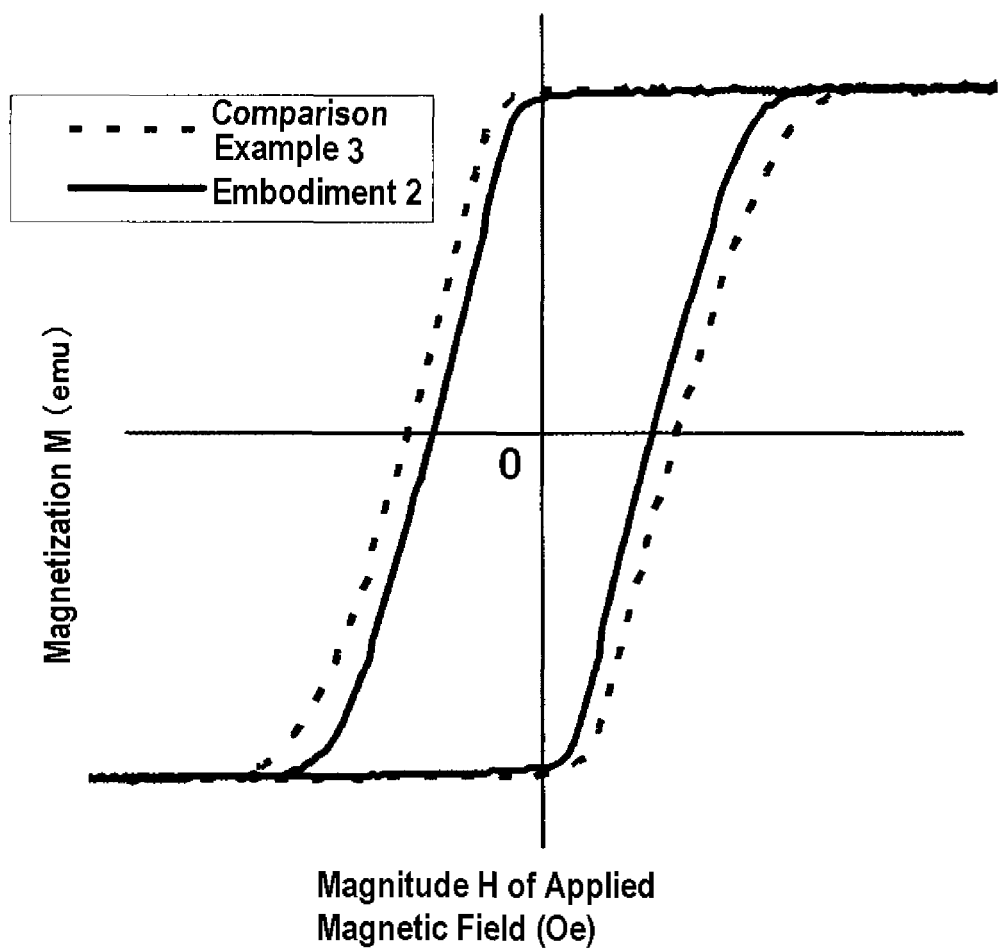
FIG. 3 compares characteristics for an embodiment of the invention and a comparison example.

FIG. 3 shows magnetization curves for Embodiment 2 and Comparison Example 3. From the figure, by inserting a Ru coupling layer between magnetic recording layers, the coercivity Hc can be lowered. In the case of FIG. 3, this rate of reduction is approximately 20%. By inserting a coupling layer between at least two of the magnetic recording layers, the ease of magnetization reversal is improved.

COMPARISON EXAMPLE 4

Except for the fact that the Ru coupling layer 6 was deposited to 0.35 nm, entirely the same processes as in Embodiment 2 were used to fabricate a magnetic recording medium.

Figure 4:
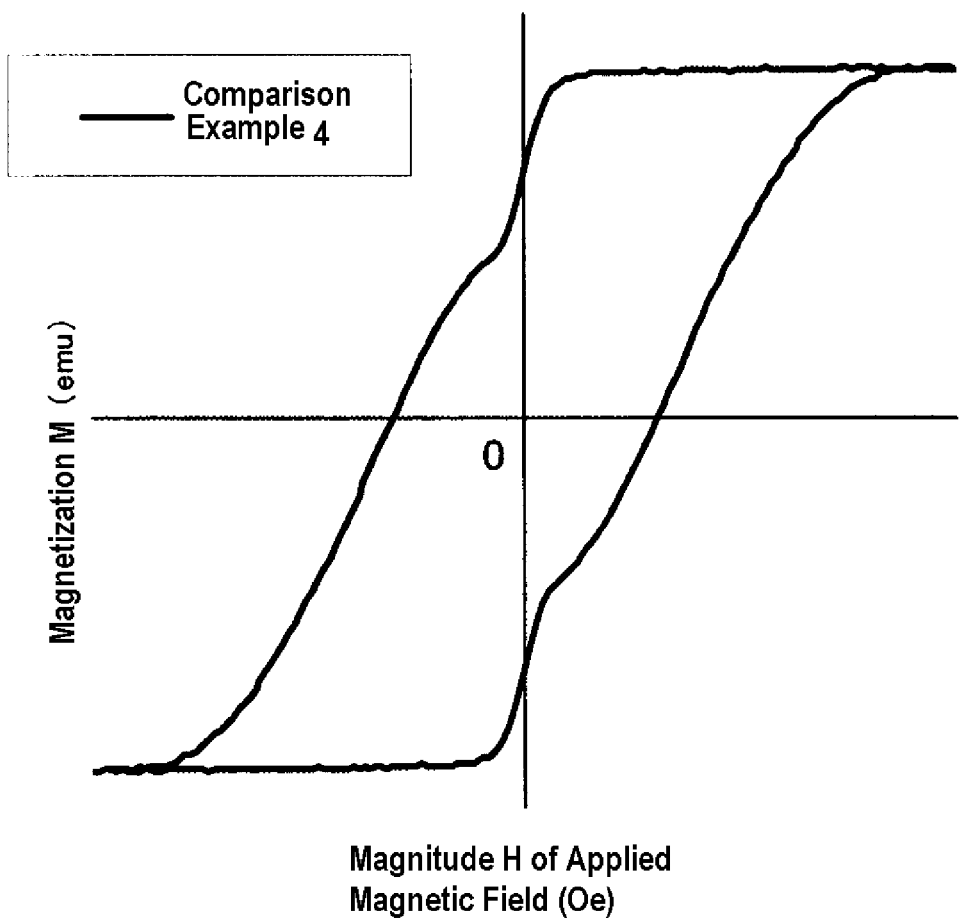
FIG. 4 shows characteristics of a comparison example.

FIG. 4 shows a magnetization curve for Comparison Example 4. From the figure, it is seen that two-stage magnetization reversal occurs. This indicates that the ferromagnetic coupling between the first magnetic recording layer and the second magnetic recording layer is completely cut off due to the increased thickness of the coupling layer, so that the two magnetic recording layers are in a magnetically separated state. That is, if the Ru coupling layer is too thick, the coupling force between the magnetic recording layers vanishes, and a strong magnetic field is necessary to cause magnetization reversal in a high-Ku layer, so that the ease of reversal declines.

COMPARISON EXAMPLE 5

Except for the fact that the same 93(Co-8Cr-20Pt)-7SiO$_2$ target used for the first magnetic recording layer 5 was employed to deposit a granular-structure CoCrPt—SiO$_2$ second magnetic recording layer 7 of thickness 4.0 nm, entirely the same processes as in Embodiment 2 were used to fabricate a magnetic recording medium.

Figure 5:
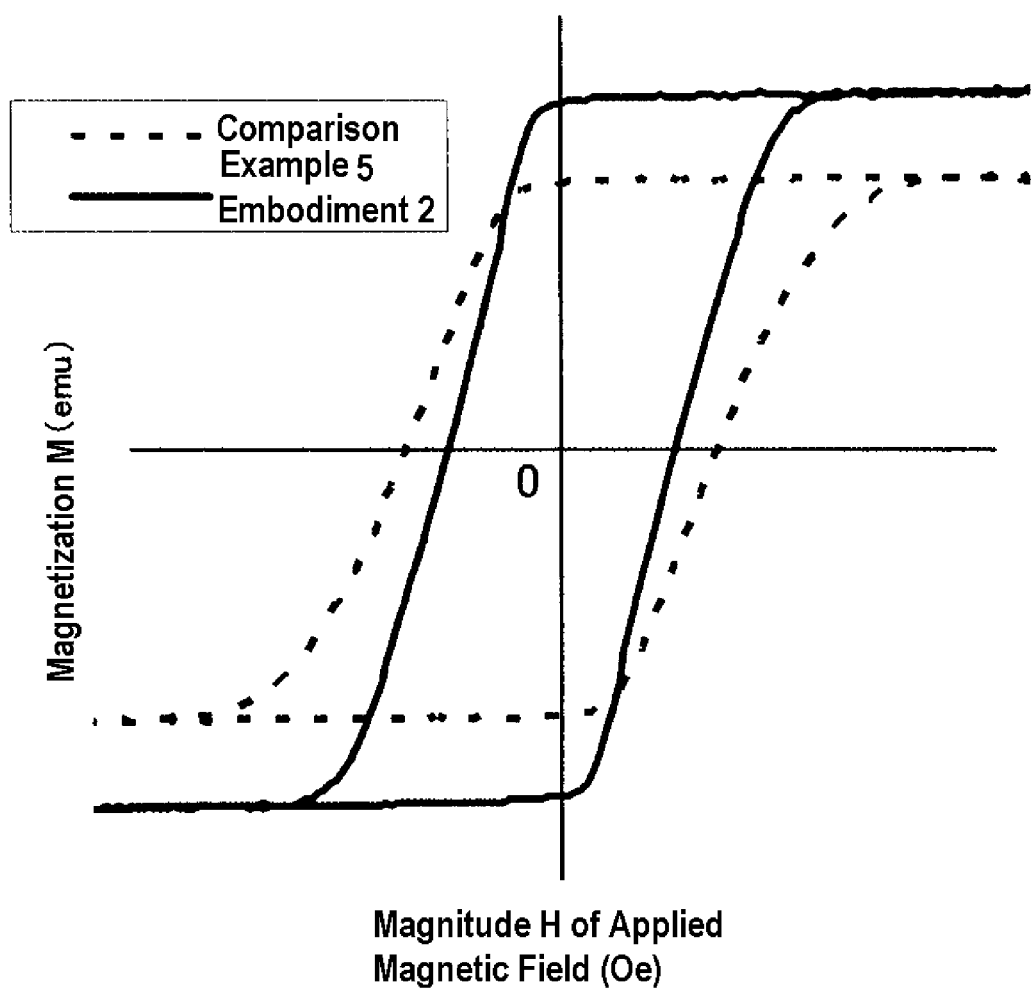
FIG. 5 compares characteristics for an embodiment of the invention and a comparison example.

FIG. 5 shows a magnetization curve for Comparison Example 5. From the figure, it is seen that if the same granular material, that is, material with the same Ku value, is used in the first and second magnetic recording layers, the ease of magnetization reversal declines.

Embodiment 3

As the nonmagnetic substrate 1, an Al alloy plated with NiP and with a flat surface was used; after cleaning, the substrate was introduced into a sputtering device, and a Co—Zr—Nb target was used to deposit a CoZrNb amorphous soft magnetic backing layer 2 of thickness 40 nm. Next, a target of Ni—Fe—Si, which is a Permalloy system alloy, was used to deposit an NiFeSi underlayer 3 of thickness 10 nm. Then, a Ru target was used to deposit a Ru nonmagnetic intermediate layer 4 of thickness 10 nm. Then, a 93(Co-8Cr-20Pt)-7SiO$_2$ target was used to deposit a granular-structure CoCrPt—SiO$_2$ first magnetic recording layer 5 of film thickness 4 to 8 nm. Next, a Ru target was used to deposit a Ru coupling layer 6 of film thickness 0.2 nm. Then, a 93(Co-15Cr-10Pt)-7SiO$_2$ target was used to deposit a granular-structure CoCrPt—SiO$_2$ second magnetic recording layer 7 of film thickness 4.0 nm. A third magnetic recording layer 8 was not deposited, and finally, a carbon target was used to deposit a protective layer 9 of carbon, of film thickness 3 nm, after which the substrate was removed from the vacuum device. The first and second magnetic recording layers were deposited by RF magnetron sputtering, and the other layers were formed by DC magnetron sputtering. Thereafter, a liquid lubricant layer 10 of a perfluoro polyether, of thickness 2 nm, was formed by the dipping method, to obtain a perpendicular magnetic recording medium.

COMPARISON EXAMPLE 6

Except for the fact that the coupling layer 6, second magnetic recording layer 7, and third magnetic recording layer 8 were not deposited, entirely the same processes as in Embodiment 3 were used to fabricate a magnetic recording medium.

COMPARISON EXAMPLE 7

Except for the facts that a 93(Co-8Cr-20Pt)-7SiO$_2$ target was used to deposit a granular-structure CoCrPt—SiO$_2$ first magnetic recording layer 5 of thickness 8 to 12 nm, and that a coupling layer 6, second magnetic recording layer 7, and third magnetic recording layer 8 were not deposited, entirely the same processes as in Embodiment 3 were used to fabricate a magnetic recording medium.

Here, the total film thickness of the magnetic recording layers were equal in Embodiment 3 and in Comparison Example 7. Ku values were the same as the measured values in Embodiment 1.

Figure 6:
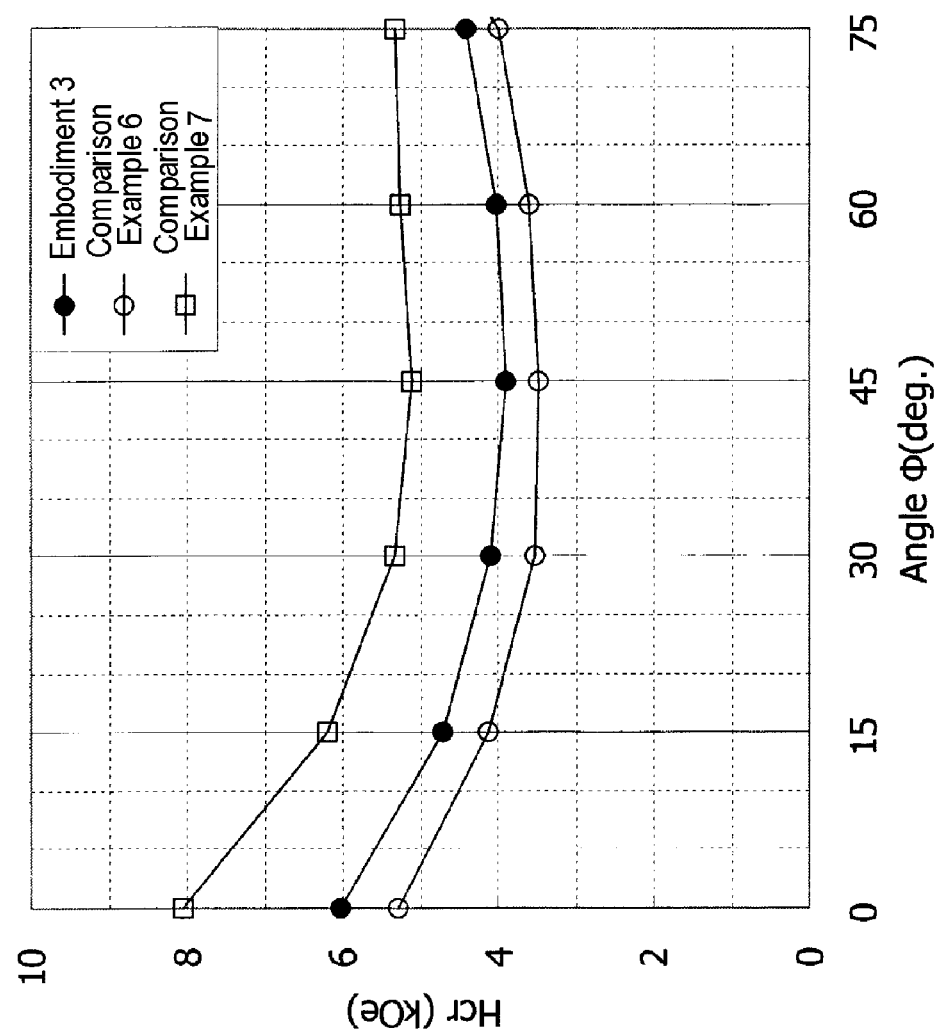
FIG. 6 compares characteristics for an embodiment of the invention and comparison examples.

FIG. 6 shows measured results for the applied magnetic field angle dependence of the residual coercivity Hcr, essentially close to the magnetic field used during data recording, when the first magnetic recording layer thickness was 8 nm. From the figure, in Comparison Example 7, when there is only a first magnetic recording layer formed to 12 nm, the Hcr is high, at 8 kOe for a perpendicular magnetic field. When the same first magnetic recording layer is made 8 nm in Comparison Example 6, it is seen that the value drops to 5.2 kOe. By reducing the thickness of the first magnetic recording layer with a high Ku, the fractional volume is reduced, and the Hcr, that is, the coercivity, is lowered. Here, Ku is unchanged. On the other hand, when a second magnetic recording layer is placed above with a coupling layer intervening in the overall magnetic recording layer, as in Embodiment 3, compared with Comparison Example 7 comprising only the material used in the first magnetic recording layer of the same thickness, it is clear that the coercivity is effectively lowered. Further, because the Ku of the first magnetic recording layer is maintained by the coupling layer, thermal stability can be secured.

Embodiment 4

Except for the fact that a 96(Co-15Cr-10Pt)-4B target was used to deposit a CoCrPtB third magnetic recording layer 8 of thickness 8 to 12 nm, entirely the same processes as in Embodiment 1 were used to fabricate a magnetic recording medium.

COMPARISON EXAMPLE 8

Except for the fact that a coupling layer 6 was not deposited, entirely the same processes as in Embodiment 4 were used to fabricate a magnetic recording medium.

Figure 7:
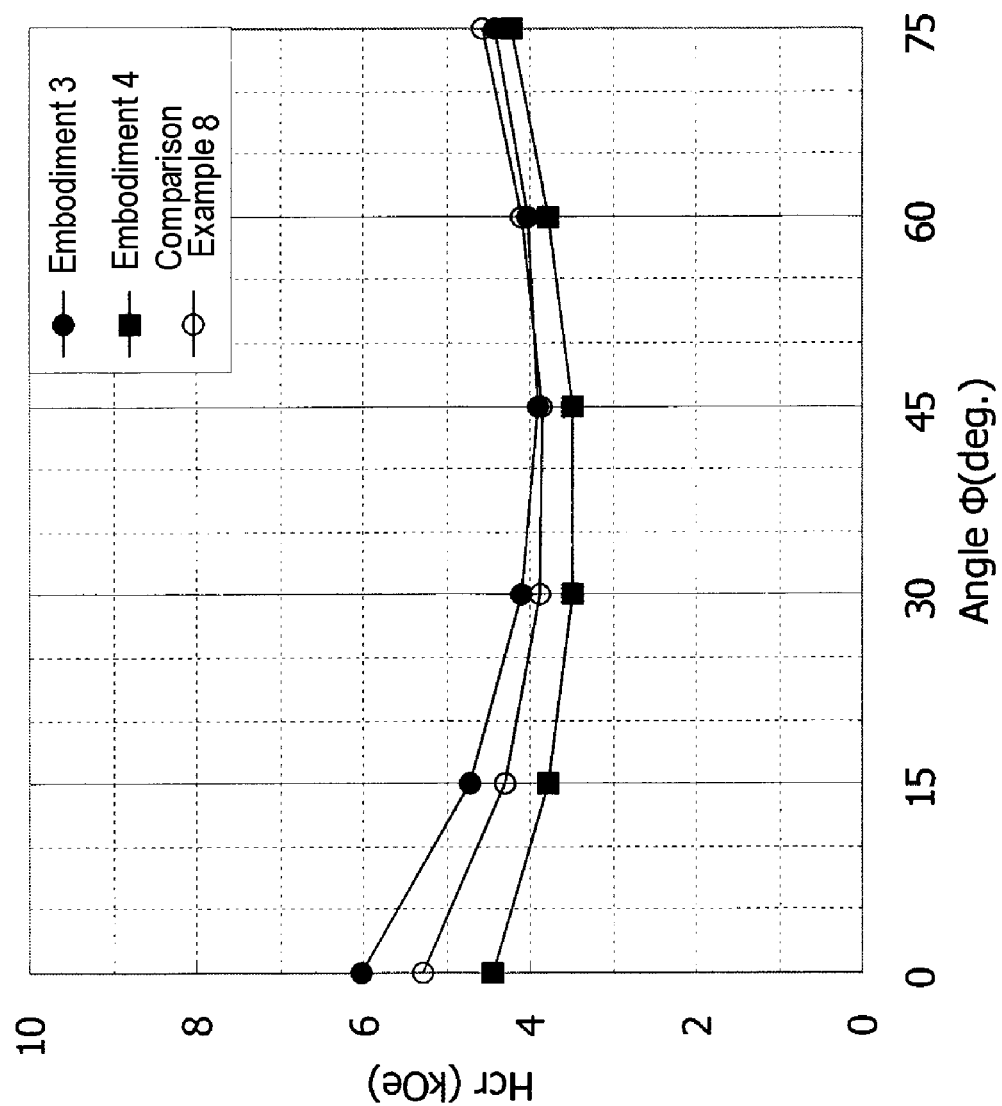
FIG. 7 compares characteristics for two embodiments of the invention and a comparison example; and, FIG. 8 compares characteristics for two embodiments of the invention and a comparison example.

FIG. 7 shows the measured results for the applied magnetic field dependence of Hcr in Embodiment 4, Comparison Example 7, and Embodiment 3. From the figure, it is seen that when by using a third magnetic recording layer in a magnetic recording layer with a three-layer structure, the Hcr is reduced to 4.4 kOe for a perpendicular magnetic field. On the other hand, when no coupling layer 6 is formed, the rate of decrease of Hcr is poor, and it is clear that there is effectively no reduction in the coercivity. In addition, because a coupling layer 6 is not used, the effective Ku for the entirety of the magnetic recording layer is reduced, and thermal stability is degraded.

Figure 8:
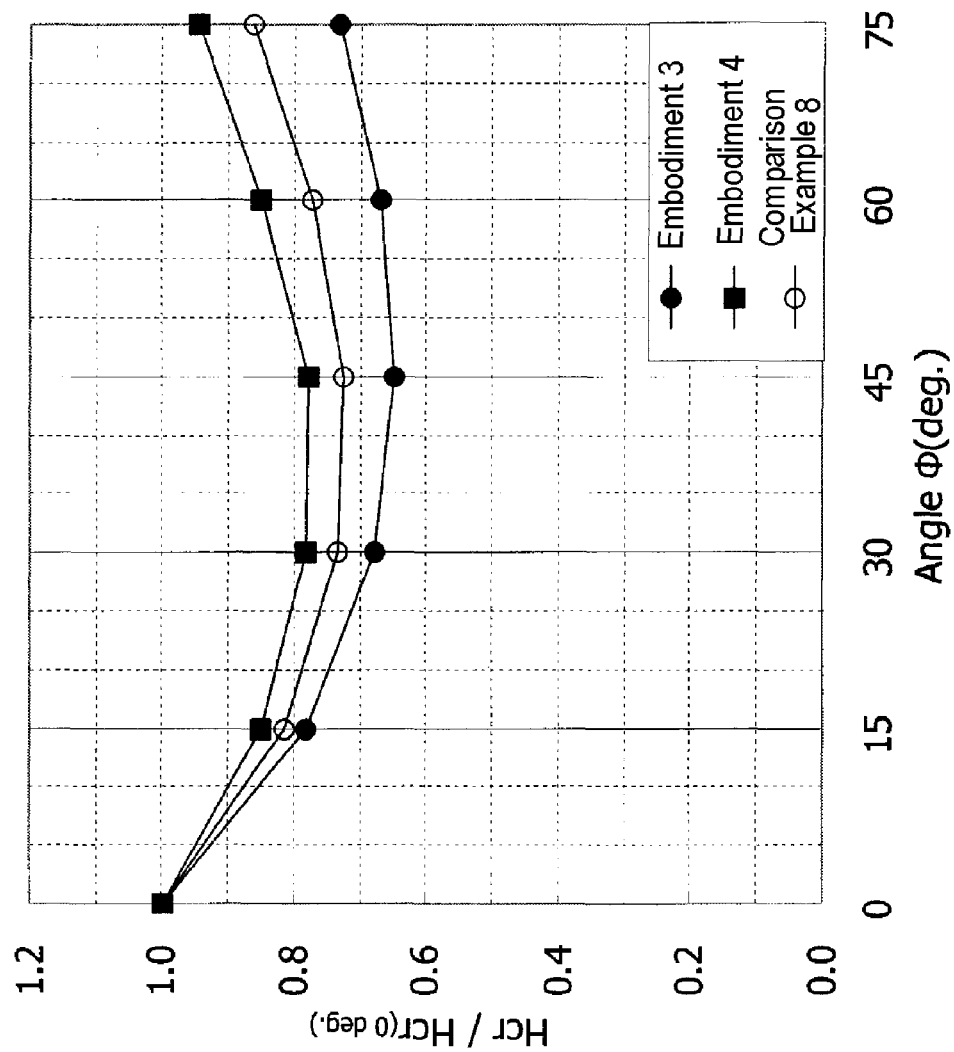

Focusing on changes with the angle of the applied magnetic field, in Embodiment 4 the rate of decline at each angle relative to a perpendicular magnetic field (0 deg) is seen to be suppressed. FIG. 8 shows numerical values for the results of FIG. 7, normalized by the Hcr for a perpendicular magnetic field. The change in Hcr with the angle in Embodiment 4 is within the smallest range compared with any other data, and there is little variation with the angle. This is due to the fact that a high magnetization reversal initiation field Hn is obtained by using a CoCrPtB third magnetic recording layer 8. As a result, even at high recording densities, data record/reproduce errors can be reduced, media noise can be suppressed, and magnetic recording media performance can be improved.

Hence by means of this invention, by appropriately setting the ferromagnetic coupling between magnetic recording layers in a perpendicular magnetic recording medium, and by further providing three magnetic recording layers having different Ku values, the switching magnetic field of the magnetic recording medium can be lowered without detracting from thermal stability, through improvement of the thermal stability index KuV and reduction of Hc which depends on Ku, and at the same time, improvement of noise characteristics, S/N characteristics, and other magnetic recording media performance characteristics can be reliably achieved. As a result, thermal stability, ease of recording, and recording density of the magnetic recording medium can be simultaneously improved.

The invention claimed is:

1. A perpendicular magnetic recording medium, comprising:
    a first magnetic recording layer, a second magnetic recording layer, and a third magnetic recording layer disposed sequentially on a nonmagnetic substrate, the first, second and third magnetic recording layers having an easy axis of magnetization in a direction perpendicular to a film plane of the nonmagnetic substrate; and
    a coupling layer formed between the first and second magnetic recording layers, the first and second magnetic recording layers being ferromagnetically coupled via the coupling layer, wherein
    the third magnetic recording layer is coupled with the second magnetic recording layer, with no coupling layer formed therebetween;
    the first and second magnetic recording layers have a granular structure, in which magnetic crystal grains are dispersed in a matrix of nonmagnetic oxides or nonmagnetic nitrides; and
    the first, second and third magnetic recording layers respectively have a uniaxial anisotropy constant Ku1, Ku2 and Ku3, where Ku1>Ku2>Ku3.

2. The perpendicular magnetic recording medium of claim 1, wherein the coupling layer includes an element selected from a group consisting of V, Cr, Fe, Co, Ni, Cu, Nb, Mo, Ru, Rh, Ta, W, Re and Ir.

3. The perpendicular magnetic recording medium of claim 1, wherein the coupling layer includes an alloy of which a main component is an element selected from the group of elements consisting of V, Cr, Fe, Co, Ni, Cu, Nb, Mo, Ru, Rh, Ta, W, Re and Ir.

4. The perpendicular magnetic recording medium of claim 1, wherein the coupling layer is of a thickness of 0.3 nm or less.

5. The perpendicular magnetic recording medium of claim 1, further comprising a soft magnetic backing layer disposed on the nonmagnetic substrate, underneath the first magnetic recording layer.

6. The perpendicular magnetic recording medium of claim 1, further comprising an underlayer disposed on the nonmagnetic substrate, underneath the first magnetic recording layer.

7. The perpendicular magnetic recording medium of claim 1, further comprising a nonmagnetic intermediate layer disposed on the nonmagnetic substrate, the first magnetic recording layer being disposed on the nonmagnetic intermediate layer.

8. The perpendicular magnetic recording medium of claim 1, further comprising a soft magnetic backing layer and an underlayer sequentially disposed on the nonmagnetic substrate, the underlayer being underneath the first magnetic recording layer.

9. The perpendicular magnetic recording medium of claim 1, further comprising a soft magnetic backing layer, an underlayer and a nonmagnetic intermediate layer sequentially disposed on the nonmagnetic substrate, the first magnetic recording layer being disposed on the nonmagnetic intermediate layer.

10. A perpendicular magnetic recording medium, comprising:
   a first magnetic recording layer, a second magnetic recording layer, and a third magnetic recording layer disposed sequentially on a nonmagnetic substrate, the first, second and third magnetic recording layers having an easy axis of magnetization in a direction perpendicular to a film plane of the nonmagnetic substrate; and
   a coupling layer formed between the first and second magnetic recording layers, the first and second magnetic recording layers being ferromagnetically coupled via the coupling layer, wherein
   the third magnetic recording layer is coupled with the second magnetic recording layer, with no coupling layer formed therebetween; and
   the first, second and third magnetic recording layers respectively have a uniaxial anisotropy constant Ku1, Ku2 and Ku3, where Ku1>Ku2>Ku3.

11. The perpendicular magnetic recording medium of claim 10, wherein the coupling layer includes an element selected from a group consisting of V, Cr, Fe, Co, Ni, Cu, Nb, Mo, Ru, Rh, Ta, W, Re and Ir.

12. The perpendicular magnetic recording medium of claim 10, wherein the coupling layer includes an alloy of which a main component is an element selected from the group of elements consisting of V, Cr, Fe, Co, Ni, Cu, Nb, Mo, Ru, Rh, Ta, W, Re and Ir.

13. The perpendicular magnetic recording medium of claim 10, wherein the coupling layer is of a thickness of 0.3 nm or less.

14. The perpendicular magnetic recording medium of claim 10, further comprising a soft magnetic backing layer disposed on the nonmagnetic substrate, underneath the first magnetic recording layer.

15. The perpendicular magnetic recording medium of claim 10, further comprising an underlayer disposed on the nonmagnetic substrate, underneath the first magnetic recording layer.

16. The perpendicular magnetic recording medium of claim 10, further comprising a nonmagnetic intermediate layer disposed on the nonmagnetic substrate, the first magnetic recording layer being disposed on the nonmagnetic intermediate layer.

17. The perpendicular magnetic recording medium of claim 10, further comprising a soft magnetic backing layer and an underlayer sequentially disposed on the nonmagnetic substrate, the underlayer being underneath the first magnetic recording layer.

18. The perpendicular magnetic recording medium of claim 10, further comprising a soft magnetic backing layer, an underlayer and a nonmagnetic intermediate layer sequentially disposed on the nonmagnetic substrate, the first magnetic recording layer being disposed on the nonmagnetic intermediate layer.

* * * * *